United States Patent [19]

Fester

[11] 4,082,033
[45] Apr. 4, 1978

[54] AUTOMATIC DOUGHNUT MAKING MACHINE

[76] Inventor: Amos M. Fester, 1821 University Ave., St. Paul, Minn. 55101

[21] Appl. No.: 729,089

[22] Filed: Oct. 4, 1976

[51] Int. Cl.² .............................................. A47J 37/12
[52] U.S. Cl. ......................................... 99/406; 99/407; 99/409
[58] Field of Search .......................... 99/406, 403–404, 99/405, 361, 427, 352, 353, 355, 426, 427, 442, 450; 417/424; 426/439, 440; 220/17, 20.5, 231; 4/110

[56] References Cited

U.S. PATENT DOCUMENTS

| | | | |
|---|---|---|---|
| 1,486,986 | 3/1924 | Morris et al. | 426/439 |
| 2,067,849 | 1/1937 | Hunter | 99/405 |
| 2,208,874 | 7/1940 | Toews | 99/406 |
| 2,525,370 | 10/1950 | Pollak | 417/424 |
| 2,530,920 | 11/1950 | Toews | 99/406 |
| 2,936,698 | 5/1960 | Giles | 99/405 X |
| 3,026,885 | 3/1962 | Eytinge | 99/405 X |
| 3,172,850 | 3/1965 | Englesberg et al. | 417/424 X |
| 3,329,081 | 7/1967 | Roth | 99/405 |
| 3,504,619 | 4/1970 | Fester et al. | 99/405 X |
| 3,731,614 | 5/1973 | Smith et al. | 99/404 |

*Primary Examiner*—Harvey C. Hornsby
*Attorney, Agent, or Firm*—Burd, Braddock & Bartz

[57] ABSTRACT

A compact table-top automatic doughnut making machine for use at lunch counters, in-store bakery counters, small bakeries, and the like, where freshly cooked doughnuts are sold in moderately large volume. The machine is particularly adaptable to varying volume requirements, being adjustable to produce from about 5 dozen to 100 dozen doughnuts per hour. The machine includes a generally rectangular compact tank for containing the cooking fat or oil which is heated by automatic thermostatically controlled means. A removable insert in the tanks defines a circuitous path along which the doughnuts flow in the course of being cooked. A removable dough extruding unit is mounted over one end of the tank to form and drop rings of raw dough into the oil. The dough is moved along the surface of the cooking oil by a propulsion pump inducing a circulating flow of oil as the doughnut is first cooked on one side, turned over automatically, cooked on the other side and discharged from the machine. The machine can be readily disassembled for easy cleaning.

9 Claims, 13 Drawing Figures

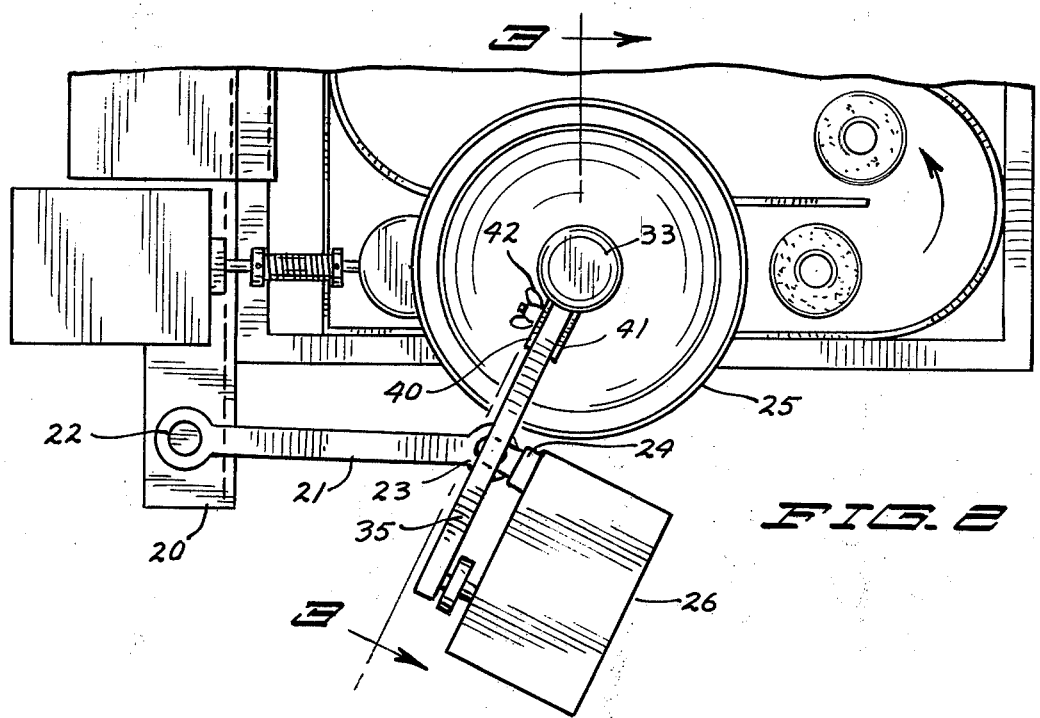
FIG.2
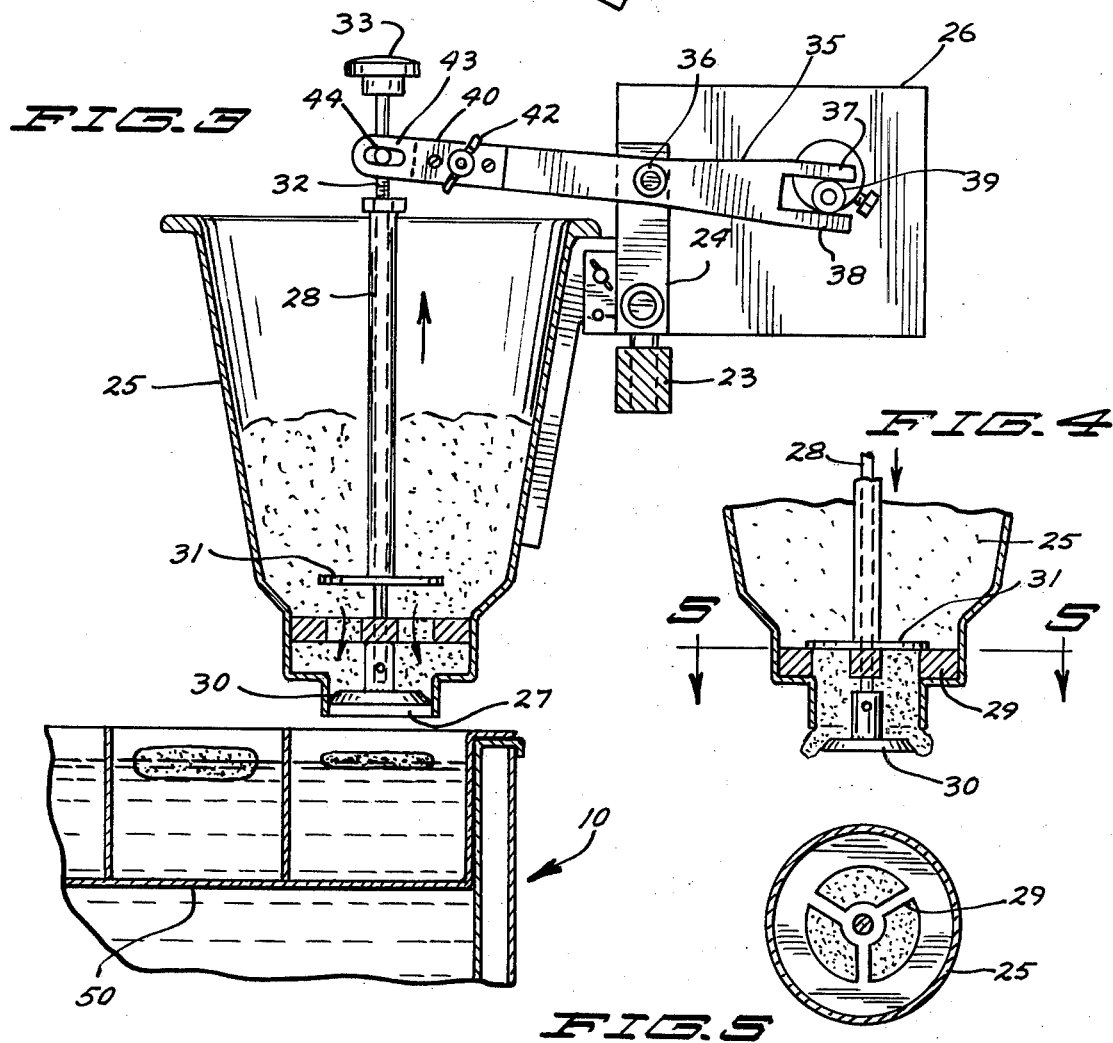
FIG.3
FIG.4
FIG.5

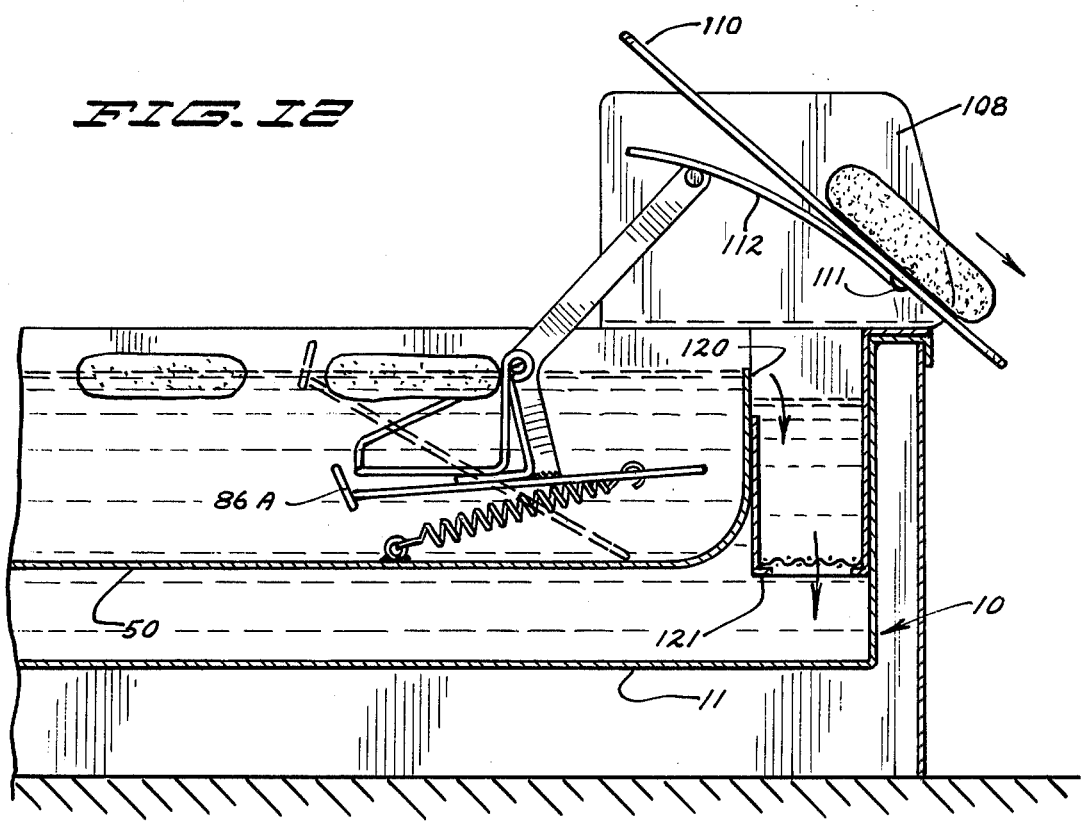
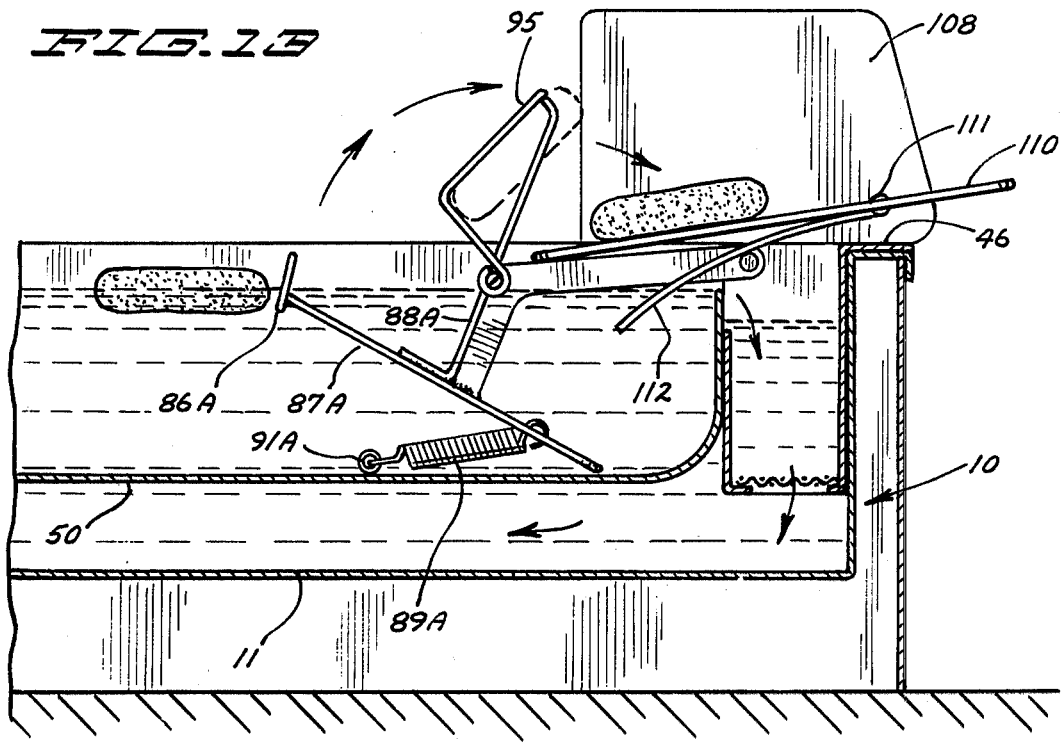

AUTOMATIC DOUGHNUT MAKING MACHINE

BACKGROUND OF THE INVENTION

1. Field of the Invention

This invention relates to a compact automatic doughnut making machine adapted for use on table-top or counter-top in such places as lunch counters, delicatessens, grocery store and discount store bakery counters, small bakeries, and the like, in which doughnuts are sold in moderately large volume.

2. The Prior Art

Many doughnut making machines are available. Most of these have been large, bulky, expensive and adapted to produce doughnuts in large quantities, or they have been largely small manually operated units adapted for low volume production. U.S. Pat. No. 3,504,619, issued to the present inventor, discloses a compact table-top automatic doughnut making machine adapted to serve the intermediate demand for moderately large volume production at a reasonable price and not requiring floor space, heavy duty electrical connections, and other disadvantages or prior art machines. The doughnut making machine of that aforesaid patent admirably fulfills its intended function. However, many doughnut-selling outlets experience large variations in demand for doughnuts from day to day and from hour to hour on the same day. The doughnut making machine of the present invention is directed to the satisfaction of this varying demand by its capability of producing doughnuts at varying rates ranging from about 5 dozen to 100 dozen doughnuts per hour.

BRIEF SUMMARY OF THE INVENTION

The doughnut making machine according to the present invention includes a relatively deep generally rectangular cooking vessel adapted to contain a liquid cooking medium, such as fat or oil. The tank includes an electrical heating element whose temperature is automatically thermostatically controlled in the conventional manner for the purpose of maintaining the cooking medium at the required temperature to fry the dough. The machine is provided with a removable guide insert adapted to be partially immersed in the cooking medium and defining a circuitous serpentine path along which the doughnut floats as it is being cooked. The guide insert comprises a plurality of vertical longitudinally extending spaced apart parallel plates which define longitudinal segments of the flow path. The ends of alternate longitudinal plates are interconnected at their opposite ends by vertical arcuate plates which define arcuate flow paths connecting successive longitudinal flow paths.

A removable dough extruder is movably mounted above the vessel adapted to be positioned over the upstream end of the circuitous flow path. A submerged pump is disposed in the tank at the upstream end of the flow path to circulate the cooking medium to provide the transport system for the doughnuts. To separate the circulating cooking medium providing the transport system from the remainder of the cooking medium, the guide insert is provided with a bottom wall spaced from the bottom of the tank to provide a sump for cooking medium to be collected at the discharge end of the flow path and recirculated. Approximately midway along the circuitous flow path the machine includes an automatic turning device for turning over partially cooked doughnuts. At the downstream end of the flow path there is an automatic ejector device to discharge the fully cooked doughnuts. Automatic hold-back means are provided to insure systematic one-by-one turn-over and discharge of the cooked doughnuts.

BRIEF DESCRIPTION OF THE DRAWINGS

The doughnut making machine, according to the present invention, is illustrated in the accompanying drawings in which the same numerals are used to identify corresponding parts and in which:

FIG. 2 is a fragmentary top plan view of the upstream end of the flow path;

FIG. 3 is a vertical section on the line 3—3 of FIG. 2 and in the direction of the arrows, showing the dough extruder disc in upper position;

FIG. 4 is a similar fragmentary section showing the extruder disc in lower position;

FIG. 5 is a horizontal section on the line 5—5 of FIG. 4 and in the direction of the arrows;

FIG. 12 is a fragmentary vertical section on the line 12—12 of FIG. 6 and in the direction of the arrows, showing additionally means for ejecting cooked doughnuts from the machine; and FIG. 13 is a similar section showing the ejector means in doughnut receiving position.

DETAILED DESCRIPTION OF THE PREFERRED EMBODIMENT

Figure 1:
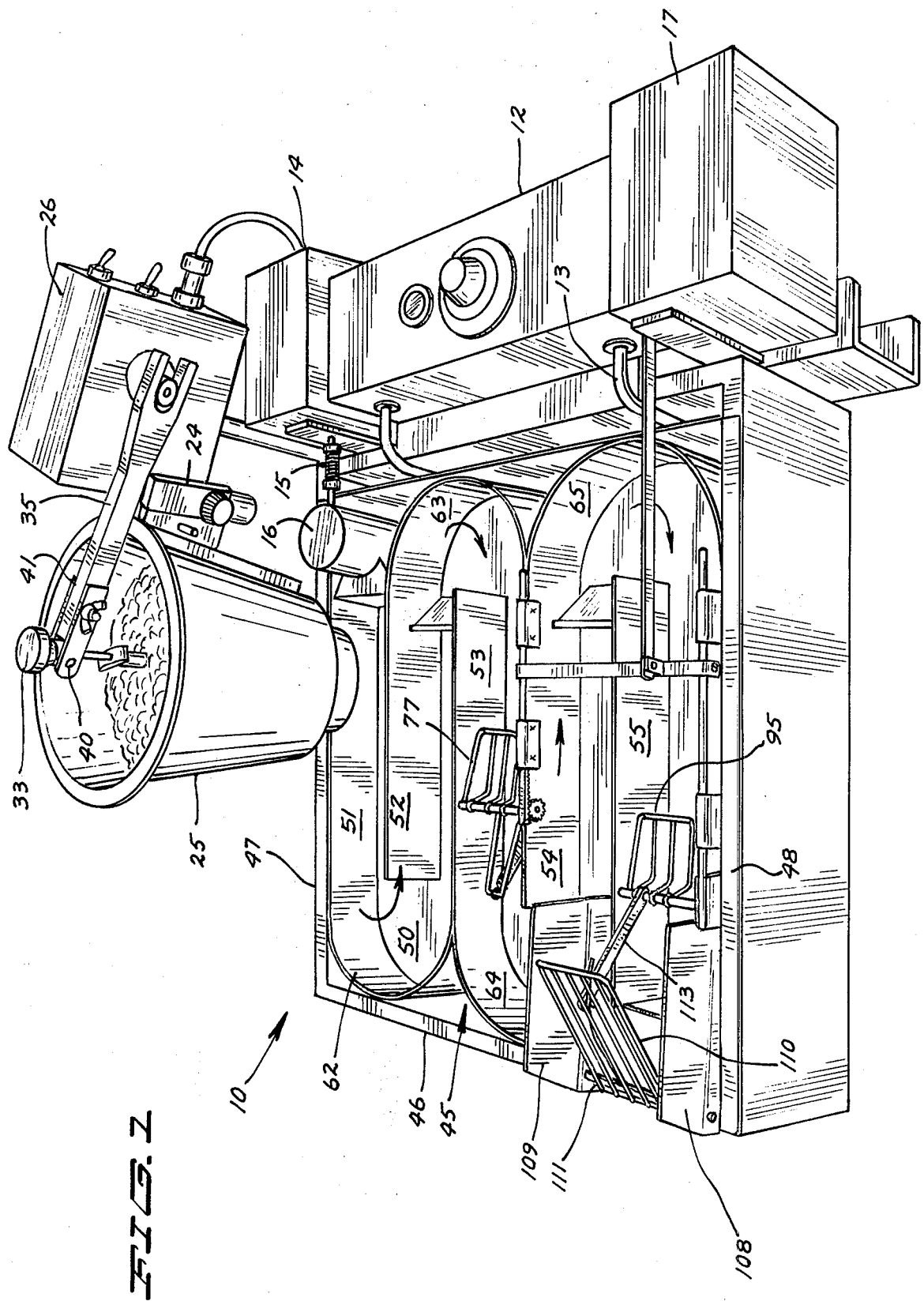
FIG. 1 is a top perspective view of the doughnut making machine.
Figure 6:
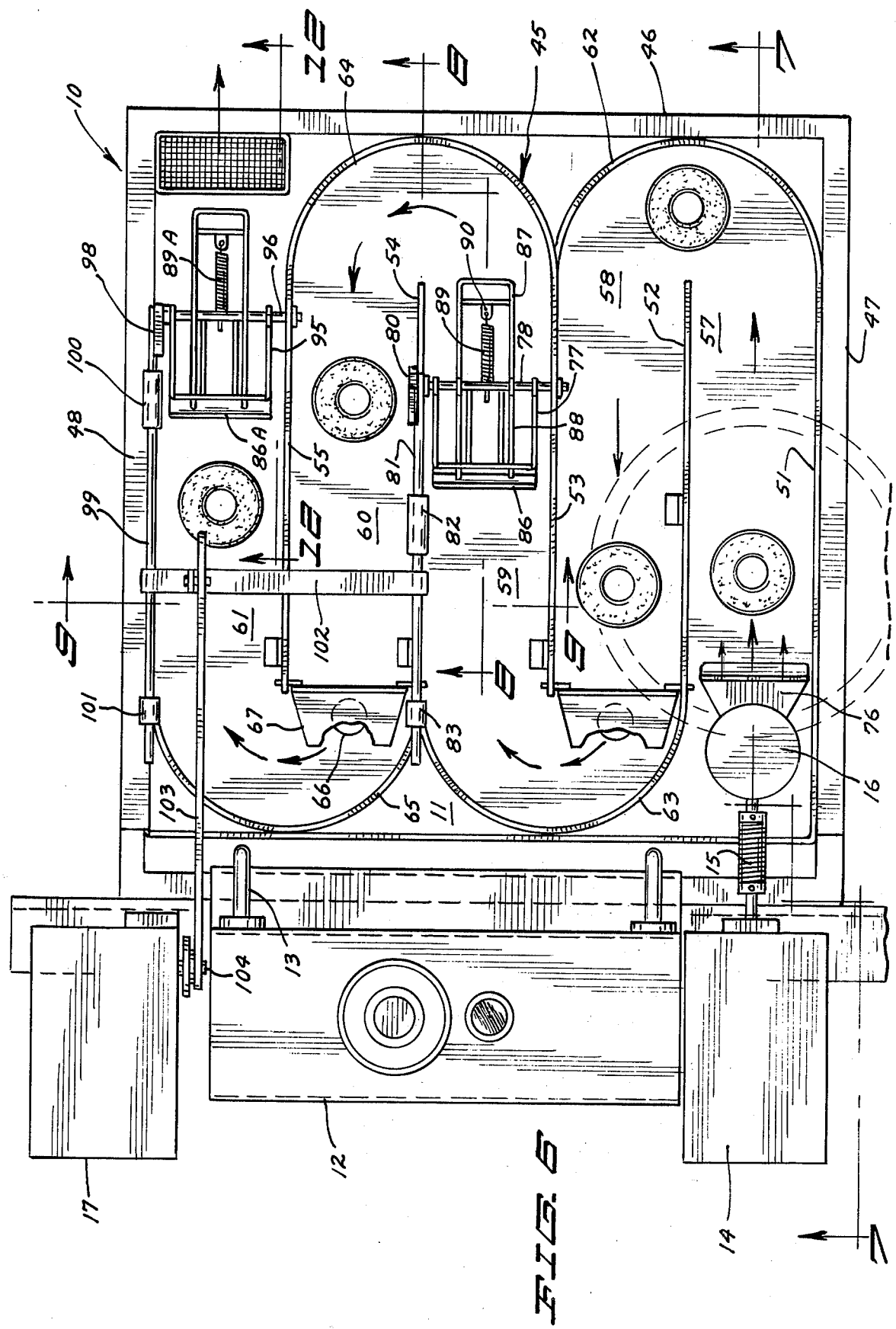
FIG. 6 is a top plan view of the machine shown for greater clarity without the dough extruder and doughnut ejector in place.
Figure 7:
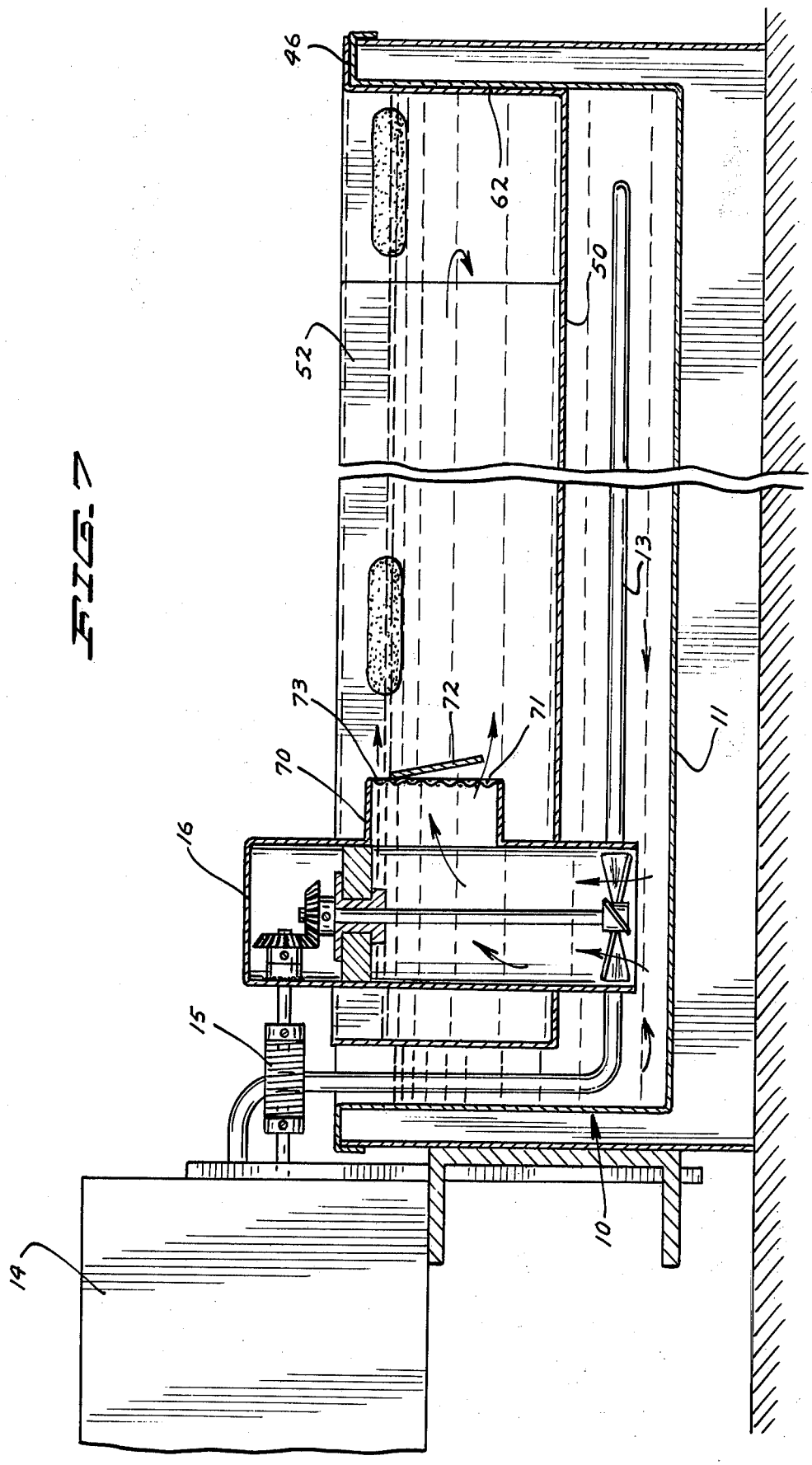
FIG. 7 is a vertical section showing details of the upstream end of the transport flow path.

Referring now to the drawings, and particularly to FIGS. 1 and 6, there is shown in top perspective and plan views an automatic doughnut making machine according to the present invention including a rectangular tank 10 having the conventional bottom wall 11 and front, back and side walls. Suspended from the top edge of the back wall is a control box 12 containing conventional automatic thermostatic control means for an electrical heating element 13 along with an on-off switch, temperature selection dial, pilot light, etc., all as are well known. Also suspended from the back wall of the tank is an electric motor and gear box 14 with a readily disconnected coupling 15 to a pump 16 for circulating cooking medium within the tank as hereinafter more fully described. Another electric motor and gear box 17 is suspended from the tank for driving the turn-over and discharge means, as hereinafter more fully described.

A dough extruder is movably and detachably mounted above the tank 10 by means of a bracket 20 secured to one upper corner of the tank from which a support arm 21 is pivotally secured at one end 22 at the top of a vertical post or standard raising the extruder to the required height. The opposite end 23 of arm 21 pivotally supports a bracket 24 to which are fixedly secured the funnel-like hopper 25 of the dough extruder and electric motor and gear box 26 for driving the extruder. The hopper 25 serves as a repository for dough to be extruded into the cooking tank. In operative position, the extruder is positioned over the upstream end of the doughnut flow path, as seen in FIGS. 1 and 2.

The dough extruder has a diminishing conical or funnel portion at its lower end terminating in a circular opening 27 which functions as an extruding die. A vertically reciprocable rod or shaft 28 is disposed within the hopper sliding in a spider 29 disposed in the narrow throat of the hopper. The bottom end of shaft 28 carries a circular cutting disc or plate 30 which forms the dough into doughnut shape coacting with opening 27. A dough advancing plate 31 is slidably mounted on shaft 28. An adjusting screw 32 threadably engages the top end of shaft 28. Handle or knob 33 facilitates adjustment of the stroke of the extruder plate 30.

Reciprocation of the dough extruder shaft is by virtue of an actuating arm 35 pivotally supported intermediate of its ends at 36 by bracket 24. One end of actuating arm 35 has a pair of vertically spaced apart fingers 37 and 38 which engage a crank arm 39 driven by the electric motor within motor and gear box 26. The opposite end of actuating arm 35 includes a pair of horizontally spaced apart arm extensions 40 and 41 detachably secured by virtue of wing nut and bolt 42 for ready disengagement for cleaning of the extruder. Each arm extension 40 and 41 has a longitudinal slot 43 which engages the ends of a pin 44 carried by adjusting screw 32. As best seen in FIG. 3, rotation of crank arm 39 causes rocking movement of actuating arm 35 on its pivot 36. The rocking movement is translated into reciprocatory movement of shaft 28 by virtue of engagement of pin 44 with the actuating arm extensions.

A removable guide insert, indicated generally at 45, is supported within tank 10 by virtue of flanges 46–48 which engage the top edges of the front and side walls, respectively, of the tank. The guide insert includes a bottom wall 50 spaced from the bottom wall 11 of the tank above the heating element to permit the bottom of the tank to function as a sump for recirculating of the cooking medium. The guide insert includes a plurality of elongated parallel spaced apart vertical plates 51–56 which define a plurality of flow channel segments 57–61 between each adjacent pair of wall members. Alternate vertical walls are interconnected by vertical semi-circular walls 62–65 to define a continuous serpentine flow path. Thus, vertical walls 51 and 53 are connected by semi-circular wall 62 to interconnect flow channel segments 57 and 58; the opposite ends of walls 52 and 54 are similarly connected by vertical wall 63 to interconnect channel segments 58 and 59; etc. To facilitate partial submersion of the channel insert into a tank of cooking medium, a plurality of holes 66 are provided in bottom wall 50, as seen in FIG. 6. Each hole 66 is covered by a pivotable flap 67 which functions as a check valve during operation of the machine.

The discharge of pump 16 is provided with an outwardly flaring nozzle 70 covered with a screen 71 and of width corresponding generally to that of flow channel segment 57 and height corresponding generally to the intended depth of cooking medium within that channel. Screen 77 is partially covered by a flap 72 which divides the flow from pump 16 into a surface flow through slot 73 and a submerged flow through the shielded screen opening. The cooking medium is circulated, being drawn from the sump below floor 50 and discharged through nozzle 70.

During operation, the dough extruder is positioned above the upstream end of channel segment 57 immediately downstream from the pump nozzle. The initial raw dough is carried along the surface of the cooking medium in that channel segment. It passes from channel segment 57 into channel segment 58 and thence downstream through the successive flow channel segments to the discharge. As it travels, that portion of the dough which is submerged in the cooking medium cooks and browns. At the aproximate midpoint of the flow channel, the partially cooked doughnut is turned over to complete the cooking on the other side.

An open wire basket 77 is disposed within flow channel segment 59 fixed to a shaft 78 journaled in walls 53 and 54. A toothed pinion 79 is fixed to shaft 78 and is engaged by a toothed rack 80 carried by rod 81 supported for sliding movement in guides 82 and 83 supported by the top edge of wall 54. As rod 81 is reciprocated, as explained in greater detail hereinafter in connection with the doughnut discharge and ejector, shaft 78 is rotated through about 120° to lift a partially cooked doughnut received therein, turn it over and discharge in on the opposite side of the backet.

Figure 8:
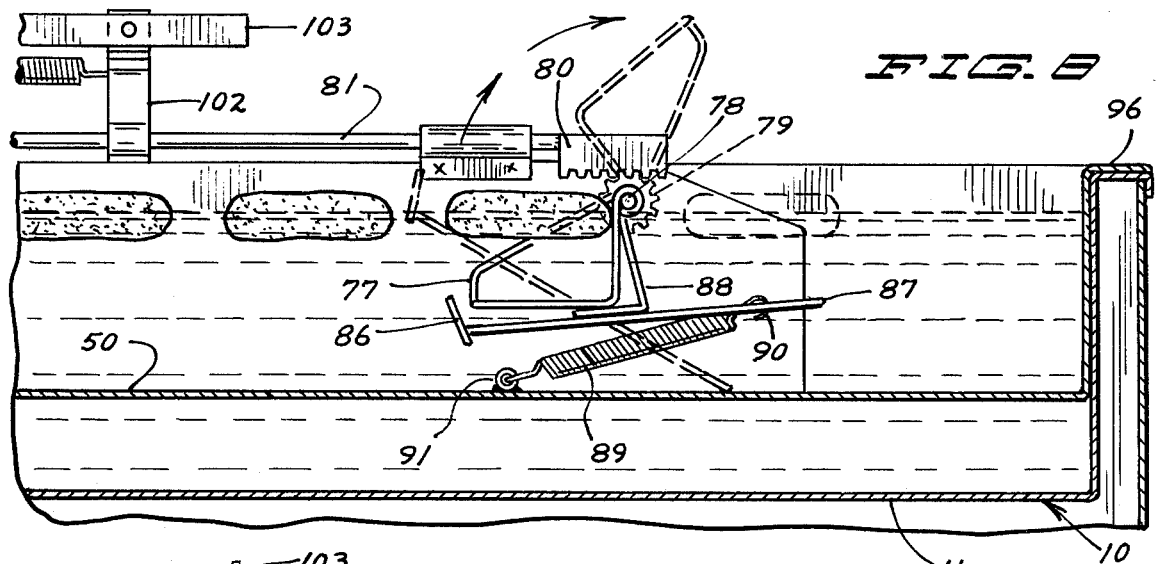
FIG. 8 is a fragmentary vertical longitudinal section on the line 8—8 of FIG. 6 and in the direction of the arrows.
Figure 9:
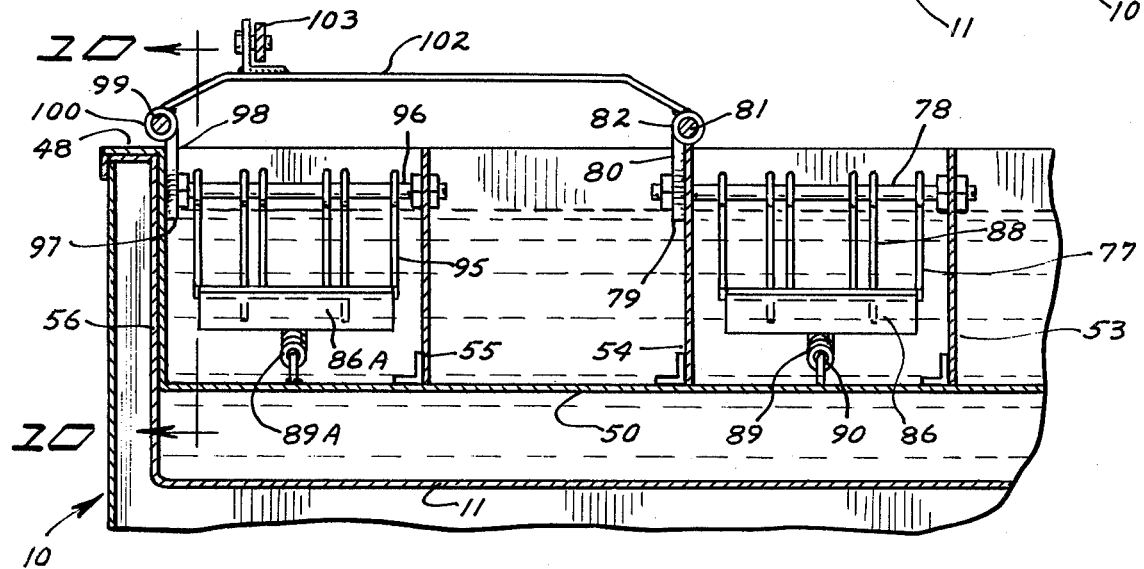
FIG. 9 is a fragmentary vertical transverse section on the line 9—9 of FIg. 6 and in the direction of the arrows.
Figure 10:
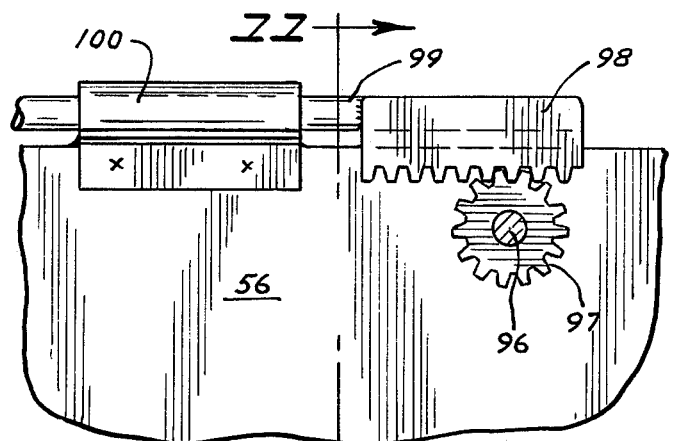
FIG. 10 is a fragmentary elevation on an enlarged scale showing the driving mechanism for the discharge means taken on the line 10—10 of FIG. 9 and in the direction of the arrows.
Figure 11:
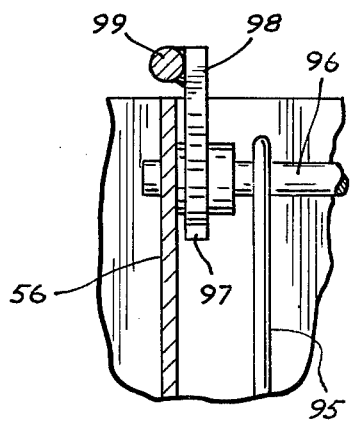
FIG. 11 is a vertical section on the line 8—8 of FIG. 10.

To prevent interference by successively following partially cooked doughnuts with the return movement of the turn-over basket, hold-back means are provided in the form of a transverse plate 86 supported from a rectangular wire frame 87 which in turn is pivotally supported from shaft 78 by means of a pair of spaced apart arms 88. One end of a coil spring 89 is connected to the frame 87 by means of clip 90 and the opposite end of the spring is anchored at 91 to the floor 50 of the guide channel insert. As best seen in FIG. 8, when turn-over basket 77 is in its downward doughnut-receiving position, the bottom of the basket bears against the hold-back means stretching spring 89 and holding plate 86 out of the flow path of the doughnuts. When basket 77 is operative to turn over a doughnut, as the basket is lifted the tension of spring 89 causes frame 87 to rotate on arms 88 bring plate 87 into position to hold back the next succeeding doughnut until the basket returns to doughnut receiving position.

Similar basket means 95 are provided to remove the fully cooked doughnut from the cooking medium. Basket 95 is fixed to shaft 96 journaled in vertical walls 55 and 56 defining the final downstream flow channel segment 61. Pinion 97 is fixed to shaft 96 and is engaged by rack 98 carried by reciprocating rod 99 guided in slides 100 and 101 mounted on the top edge of vertical wall 56. Shafts 78 and 96 are rotated in unison to operate baskets 77 and 95 in unison by virtue of a connecting bar 102 whose opposite ends are affixed to rods 81 and 99. Intermediate of its ends, bar 102 is connected to one end of an actuating arm 103 whose opposite end is connected to a crank arm 104 driven by motor and gear box 17. Another hold-back means 86A is provided which is similar in all material respects to that already described. The operation of the discharge basket and hold-back means are likewise similar to the operation of the turn-over basket and its hold-back means.

As seen in FIGS. 12 and 13, a discharge chute is provided at the extreme downstream end of the serpentine flow path defined by vertical walls 108 and 109. A rectangular wire ejector slide 110 is fixed to a shaft 111 whose ends are journaled in chute walls 108 and 109. A lifter plate 112 is secured to the under-side of slide 110. A lifter arm 113 is journaled on shaft 96 to rotate with hold-back means 86A-88A. The free end of arm 113 bears against plate 112 and supports slide 108 in an inclined position when basket 95 is in the down position. As discharge basket 95 rotates with its shaft 96, arm 113 also rotates with the hold-back means. As hold-back means 86A raises, the free end of arm 113 is lowered. As support is withdrawn from slide 110, it pivots downwardly on its shaft 111 to a horizontal position. Thus, the doughnut is discharged from basket 95 onto the top surface of slide 110. Then, as basket 95 is returned to its original position, pushing down hold-back means 86A, the free end of arm 113 is lifted and in turn lifts slide 110 to its inclined position. The completely cooked doughnut then slides off into a waiting receptacle.

A transverse weir plate 120 is provided at the downstream end of the last flow channel segment. A perforated crumb collector receptacle 121 is provided immediately adjacent to the weir 120. Any crumbs discharged from the cooking doughnuts and circulated downstream with the circulating cooking medium are collected in receptacle 21 and the cooking medium is recirculated by pump 16.

In the normal operation of the doughnut making machine, according to the present invention, the tank 10 is filled to the appropriate level with cooking fat or oil and the heating element is turned on. Pump 16 may also be turned on to circulate the cooking medium to hasten bringing the oil to the proper uniform temperature. The extruder hopper is filled with dough and the variable speed extruder drive motor is set at the proper speed depending upon the desired volume of doughnuts to be produced. When the oil is at the proper temperature, the extruder motor and the turn-over and discharge motor are turned on. The time required to cook each doughnut completely remains substantially constant, independent of the volume of production. In order for the doughnuts to cook properly, it is necessary to hold back a certain number of doughnuts at the turning point between channel segments 58 and 59 until they cook to the desired degree, according to the following schedule:

| Doughnuts held back | Dozen per hour |
| --- | --- |
| 1 | 5 |
| 2 | 10 |
| 3 | 15 |
| 4 | 20 |
| 5 | 25 |
| 6 | 30 |
| 7 | 35 |
| 8 | 40 |
| 9 | 45 |
| 10 | 50 |
| 11 | 55 |
| 12 | 60 | and so on, holding back one doughnut for each dozen per hour desired. Each time an adjustment in speed is made to vary the volume of production, then it is necessary to adjust the number of doughnuts held back accordingly, following the table. As each doughnut is cooked on one side, it is turned over and cooked on the other side as it flows toward the discharge. It is discharged onto the ejector slide and ejected from the machine.

All parts which come into contact with the dough or the cooking medium or the cooked doughnuts, including the dough extruder, the circulating pump, the guide insert, crumb collector, etc., are detachable and removable for easy cleaning.

It is apparent that many modifications and variations of this invention as hereinbefore set forth may be made without departing from the spirit and scope thereof. The specific embodiments described are given by way of example only and the invention is limited only by the terms of the apended claims.

The embodiments of the invention in which an exclusive property or privilege is claimed are defined as follows:

1. A doughnut making machine comprising:
   (A) a vessel adapted to contain a liquid cooking medium,
   (B) heating means disposed in the bottom of said vessel to heat the cooking medium,
   (C) a removable guide channel insert supported within the vessel and having a horizontal bottom wall spaced above the heating means, said channel insert comprising:
      (1) a plurality of elongated parallel spaced apart vertical walls defining a plurality of parallel channel segments,
      (2) a plurality of arcuate vertical walls interconnecting the opposite ends of alternate parallel vertical walls and defining, with the parallel vertical walls, a serpentine flow path,
      (3) a plurality of holes in said bottom wall to facilitate submersion of the insert in liquid cooking medium in said vessel,
      (4) a pivoted flap closure covering each of said holes to provide a one way valve to retain said liquid medium in said submersed insert, and
      (5) a propulsion pump at the upstream end of the first of said channel segments,
   (D) dough expelling means movably mounted above the vessel over the upstream end of the first of the channel segments immediately downstream from said pump,
   (E) power means to drive said dough expelling means,
   (F) an open turn-over means pivotally mounted between two of said vertical channel walls at the approximate midpoint of said serpentine flow path,
   (G) hold-back means operatively connected to said turn-over means to hold back partially cooked doughnuts when the turn-over means is in operation,
   (H) an open doughnut discharge means pivotally mounted between two of said vertical channel walls adjacent the downstream end of said serpentine flow path,
   (I) hold-back means operatively connected to said discharge means to hold back cooked doughnuts when the discharge means is in operation,
   (J) pivotally mounted doughnut ejector means operatively connected to the hold back means of said discharge means to receive cooked doughnuts therefrom and eject them from the vessel, and
   (K) power means for operating said turn-over means and discharge means in unison.

2. A doughnut making machine according to claim 1 further characterized in that:
   (A) said vessel is substantially rectangular, and
   (B) said channel insert is suspended within the vessel from flanges engaging the top wall edges of the vessel.

3. The doughnut making machine according to claim 1 further characterized in that said heating means is an automatic thermostatically controlled electrical heating element.

4. A doughnut making machine according to claim 1 further characterized in that:
   (A) said turn-over means and said discharge means is each comprised of a wire basket fixed to a shaft journaled in the channel walls,
   (B) a toothed pinion is fixed to said shaft, and
   (C) a toothed rack carried by a reciprocable longitudinally extending rod supported in guides on top of a channel wall engages said pinion.

5. A doughnut making machine according to claim 4 further characterized in that:
   (A) said reciprocable longitudinally extending rods are interconnected by means of a transverse cross bar; and
   (B) said cross bar in turn is pivotally connected to a longitudinal reciprocable actuating arm driven by a variable speed electric motor.

6. A doughnut making machine according to claim 1 further characterized in that:
   (A) each of said hold-back means comprises a generally vertically extending transverse bar spaced between two adjacent channel walls,
   (B) said bar is supported at one end of an open frame positioned under said turn-over and discharge means and pivotally suspended intermediate of its ends from a shaft extending between said channel walls, and
   (C) one end of a coil spring is connected to said frame adjacent the end opposite from said bar and the other end of said spring is connected to the bottom of the guide channel insert underlying said bar whereby said transverse bar is raised to the surface of the cooking medium when said turn-over means and discharge means are operative.

7. A doughnut making machine according to claim 1 further characterized in that:
   (A) said ejector means comprises an open frame pivotally connected along one edge spaced from but adjacent to the vessel wall,
   (B) a lift plate is disposed beneath said ejector means, and
   (C) an actuating arm operatively connected to the hold back means of said discharge means engages said lift plate to lower and raise the injector means in unison with operation of the discharge means.

8. A doughnut making machine according to claim 1 further characterized in that:
   (A) said pump is provided with an outwardly flaring nozzle substantially the width of the first of said channel segments and substantially the depth of the cooking medium therein,
   (B) said nozzle is vertically divided to divert part of the pump flow along the surface and the remainder along the bottom of said channel segment.

9. A doughnut making machine according to claim 1 further characterized in that:
   (A) a transverse weir plate extends across the downstream end of the last channel segment of said serpentine flow path,
   (B) said weir plate underlies said ejector means and is spaced from the vessel wall, and
   (C) a closely fitting perforated crumb collecting receptacle is disposed in said space between said weir plate and vessel wall.

* * * * *

UNITED STATES PATENT AND TRADEMARK OFFICE
CERTIFICATE OF CORRECTION

PATENT NO. : 4,082,033
DATED : April 4, 1978
INVENTOR(S) : Amos M. Fester

It is certified that error appears in the above-identified patent and that said Letters Patent are hereby corrected as shown below:

Column 1, line 23, "or" should be --of--.

Column 4, line 13, "aproximate" should be --approximate--.

Column 4, line 26, "in" should be --it--.

Signed and Sealed this

Fifth Day of September 1978

[SEAL]

Attest:

RUTH C. MASON
Attesting Officer

DONALD W. BANNER
Commissioner of Patents and Trademarks